United States Patent
Yang

(10) Patent No.: US 9,276,423 B2
(45) Date of Patent: Mar. 1, 2016

(54) CHARGING BASE FOR MULTIPLE DIFFERENT SIZED COMPONENTS POSITIONED USING ROTATING ELEMENTS

(75) Inventor: Hung-Sen Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 556 days.

(21) Appl. No.: 13/615,717

(22) Filed: Sep. 14, 2012

(65) Prior Publication Data

US 2014/0042958 A1 Feb. 13, 2014

(30) Foreign Application Priority Data

Aug. 10, 2012 (TW) .................................. 101129044

(51) Int. Cl.
*H02J 7/00* (2006.01)
(52) U.S. Cl.
CPC .............. *H02J 7/0044* (2013.01); *H02J 7/0045* (2013.01); *H02J 7/0042* (2013.01)
(58) Field of Classification Search
CPC ................. Y02E 60/12; H02J 7/0042–7/0045; H01M 10/46
USPC .......................................... 320/107, 110, 114
See application file for complete search history.

(56) References Cited

U.S. PATENT DOCUMENTS

| | | | | |
|---|---|---|---|---|
| 4,141,616 A | * | 2/1979 | Gottlieb | 439/263 |
| 5,256,954 A | * | 10/1993 | Chen | 320/110 |
| 6,124,699 A | * | 9/2000 | Suzuki et al. | 320/110 |
| 6,236,186 B1 | | 5/2001 | Helton et al. | |
| 6,610,941 B2 | * | 8/2003 | Pfeiffer | 200/61.58 R |
| 6,816,740 B2 | * | 11/2004 | Lin | 455/573 |
| 7,446,502 B2 | * | 11/2008 | Tong | 320/110 |
| 7,468,596 B2 | * | 12/2008 | Shum | 320/110 |
| 7,557,537 B2 | * | 7/2009 | Zick et al. | 320/114 |
| 8,294,417 B2 | * | 10/2012 | Kaye et al. | 320/108 |

(Continued)

FOREIGN PATENT DOCUMENTS

| | | |
|---|---|---|
| CN | 101164034 | 4/2008 |
| TW | M299967 | 10/2006 |
| TW | M346094 | 12/2008 |

OTHER PUBLICATIONS

"Office Action of China Counterpart Application" with partial translation, issued on May 4, 2015, p. 1-p. 14, in which the listed references were cited.

(Continued)

*Primary Examiner* — Stacy Whitmore
(74) *Attorney, Agent, or Firm* — Jianq Chyun IP Office

(57) ABSTRACT

An electronic assembly includes an electronic component and a base. The electronic component and another electronic component have first and second thicknesses respectively. The first thickness is greater than the second thickness. The base includes a main body having a slot, a supporting element movably disposed at the main body, and a first elastic element connected between the main body and the supporting element. When the supporting element is at a first position, the supporting element is hidden in the main body, and the electronic component having the first thickness is adapted to be inserted into the slot. When the supporting element is moved to a second position by an elastic force of the first elastic element, at least part of the supporting element is in the slot, and the electronic component having the second thickness is adapted to be inserted into the slot and supported by the supporting element.

26 Claims, 12 Drawing Sheets

(56) References Cited

U.S. PATENT DOCUMENTS

| | | | |
|---|---|---|---|
| 8,749,200 B2* | 6/2014 | Huang | 320/115 |
| 2002/0063550 A1* | 5/2002 | Chen et al. | 320/110 |
| 2006/0103347 A1* | 5/2006 | Shum | 320/110 |
| 2006/0250764 A1 | 11/2006 | Howarth et al. | |
| 2008/0185992 A1* | 8/2008 | Hoffman et al. | 320/110 |
| 2012/0062179 A1* | 3/2012 | Kuo | 320/115 |
| 2013/0088193 A1* | 4/2013 | Chen | 320/108 |

OTHER PUBLICATIONS

"Office Action of Taiwan Counterpart Application," issued on Feb. 3, 2015, p. 1-p. 11, with English translation thereof, in which the listed references were cited.

"Office Action of China Counterpart Application," issued on Nov. 10, 2015, with English translation thereof, p1-p15.

* cited by examiner

CHARGING BASE FOR MULTIPLE DIFFERENT SIZED COMPONENTS POSITIONED USING ROTATING ELEMENTS

CROSS-REFERENCE TO RELATED APPLICATION

This application claims the priority benefit of Taiwan application serial no. 101129044, filed on Aug. 10, 2012. The entirety of the above-mentioned patent application is hereby incorporated by reference herein and made a part of this specification.

BACKGROUND OF THE INVENTION

1. Field of the Invention

The invention is related to a base and an electronic assembly having the same; more specifically, to a base having a slot and an electronic assembly having the same.

2. Description of Related Art

With the development of technology, battery has become an indispensable source of electricity for portable electronic device. Portable electronic devices, such as a smart phone, a tablet pc, or a notebook computer, all may use batteries as the source of electricity. Currently, some portable devices are designed to be capable of choosing batteries with different capacity based on the requirement. Generally, a thickness and a weight of a high capacity battery are bigger than a low capacity battery. A user may choose to use the high capacity battery to prolong a usage time of the electronic device or choose to use the low capacity battery to decrease the weight of the portable device.

Charging dock with a single specification is hard to be used with batteries with different thickness and caused inconvenience for the user when charging. For example, if a width of the slot of the charging dock is corresponding to the thickness of the high capacity battery, when the user insert the low capacity battery into the slot of the charging dock, the low capacity battery is not able to be firmly inserted into the slot since its thickness is smaller than the width of the slot of the charging dock. Therefore, the low capacity battery may not able to be charged or a poor contact may be caused.

SUMMARY OF THE INVENTION

The invention provides a base adapted for electronic components with different thicknesses.

The invention provides an electronic assembly, wherein a base of the electronic assembly is adapted for electronic components with different thicknesses.

The invention provides a base adapted for an electronic component. The electronic component and another electronic component have a first thickness and a second thickness respectively. The first thickness is greater than the second thickness. The base includes a main body, a supporting element, and a first elastic element. The main body has one slot. The supporting element is movably disposed at the main body. When the supporting element is at a first position, the supporting element is hidden in the main body, and the electronic component having the first thickness is adapted to be inserted into the slot. The first elastic element is connected between the main body and the supporting element. When the supporting element is moved to a second position by an elastic force of the first elastic element, at least part of the supporting element is in the slot, and the electronic component having the second thickness is adapted to be inserted into the slot and supported by the supporting element.

An electronic assembly includes an electronic component and a base is provided. The electronic component and another electronic component have a first thickness and a second thickness respectively, and the first thickness is greater than the second thickness. The base includes a main body, a supporting element, and a first elastic element. The main body has one slot. The supporting element is movably disposed at the main body. When the supporting element is at a first position, the supporting element is hidden in the main body, and the electronic component having the first thickness is adapted to be inserted into the slot. The first elastic element is connected between the main body and the supporting element. When the supporting element is moved to a second position by an elastic force of the first elastic element, at least part of the supporting element is in the slot, and the electronic component having the second thickness is adapted to be inserted into the slot and supported by the supporting element.

In an embodiment of the invention, the supporting element is pivoted on the main body and adapted to be rotating relatively to the main body between the first position and the second position.

In an embodiment of the invention, the first thickness is equal to a thickness of the slot.

In an embodiment of the invention, when the supporting element is at the second position, the second thickness is equal to a distant between an inner wall of the slot and the supporting element.

In an embodiment of the invention, when the supporting element is at the second position, the electronic component having the first thickness is adapted to be inserted into the slot and pushes the supporting element to the first position by resisting the elastic force of the first elastic element.

In an embodiment of the invention, the supporting element includes a guide inclined plane. When the supporting element is at the second position, the electronic component having the second thickness is adapted to be inserted into the slot by a guidance of the guide inclined plane.

In an embodiment of the invention, the base further includes a positioning element and a second elastic element. The positioning element is movably disposed at the main body and adapted to resist the elastic force of the first elastic element to position the supporting element at the first position. The second elastic element is connected between the positioning element and the main body, wherein the positioning element is adapted to resist an elastic force of the second elastic element to deviate from the supporting element.

In an embodiment of the invention, the supporting element includes a groove. The positioning element includes a bump. The bump is adapted to be wedged to the groove to position the supporting element.

In an embodiment of the invention, the positioning element is pivoted on the main body. The bump is adapted to be wedged to or deviated from the groove while the positioning element rotates relatively to the main body.

In an embodiment of the invention, the base further includes a rod and a third elastic element. The rod is movably disposed at the main body. The third elastic element is connected between the rod and the main body, wherein when the positioning element positions the supporting element at the first position, the electronic component having a second thickness is adapted to be inserted into the slot and resist an elastic force of the third elastic element to push the rod, such that the positioning element is driven to deviate from the supporting element by the rod.

In an embodiment of the invention, the rod includes a pushing block. The positioning element includes a guide inclined plane. The pushing block is adapted to move along the guide inclined plane to push the positioning element, so as to drive the positioning element to deviate from the supporting element.

In an embodiment of the invention, the rod is slidably disposed on the main body. The pushing block is adapted to push the positioning element while the rod slides relatively to the main body.

In an embodiment of the invention, the rod includes a guide inclined plane. The electronic component having the second thickness is adapted to move along the guide inclined plane to push the rod.

In an embodiment of the invention, the base is a charging dock, and the electronic component is a battery.

In view of the above, a movable supporting element is disposed inside the main body of the base of the invention, and the supporting element is able to move to the first position and hide in the main body or move to the second position with at least partially disposed in the slot. When the supporting element is at the first position, a user may insert an electronic component with a thicker thickness into the slot while the supporting element hidden inside the main body may not become an obstacle for the insertion of the electronic component. When the supporting element is at the second position, the user may insert an electronic component with a thinner thickness into the slot. At this point, the supporting element inside the slot is capable of supporting the electronic component and avoiding the situation where the electronic component is not able to steadily support inside the slot due to a thinner thickness. Therefore, the base of the invention is adapted to electronic component with different thickness and may be used broadly.

In order to make the aforementioned features and advantages of the invention more comprehensible, embodiments accompanied with figures are described in detail below.

DESCRIPTION OF THE EMBODIMENTS

Figure 1:
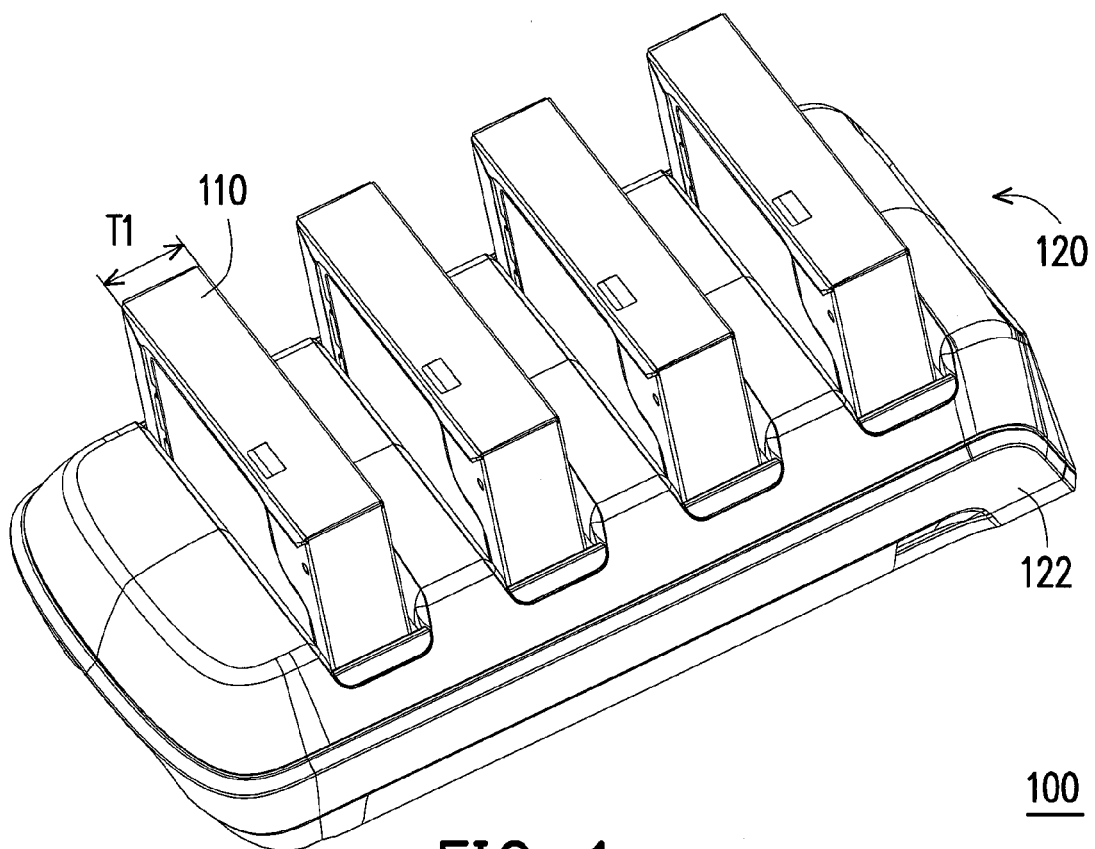
FIG. 1 is a perspective view of an electronic assembly of an embodiment of the application.
Figure 2:
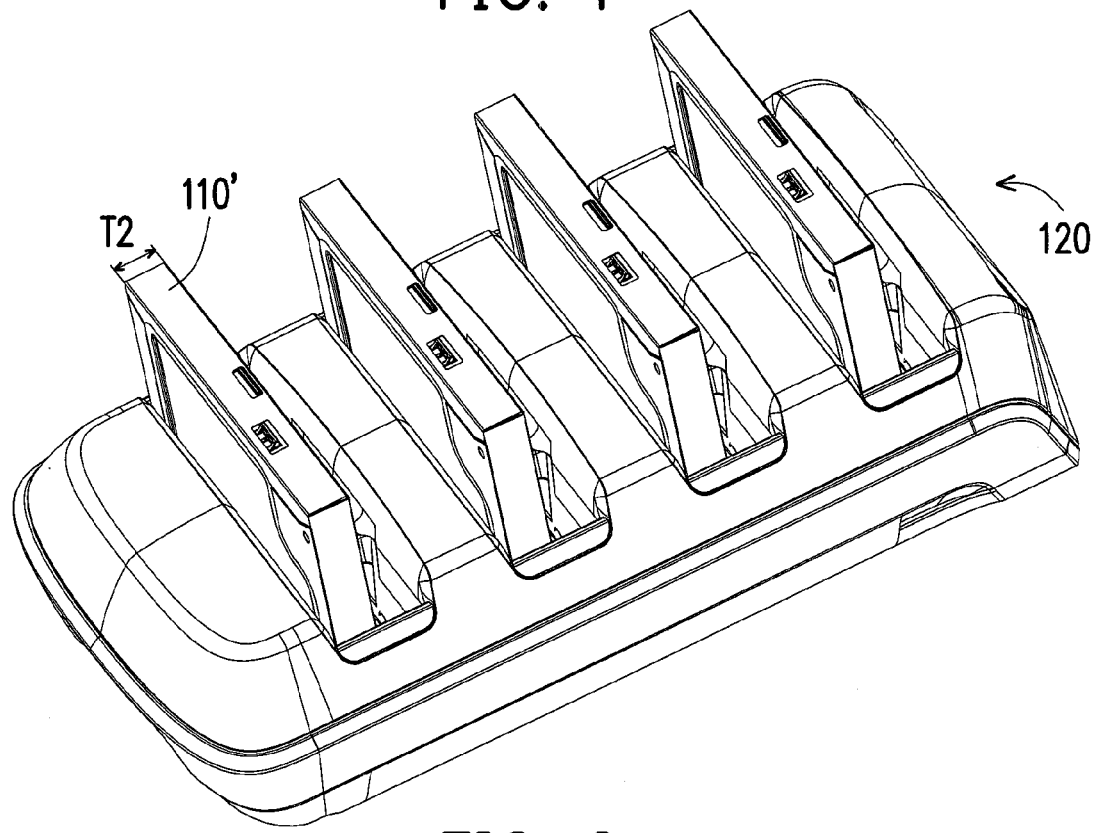
FIG. 2 is a schematic view of an electronic component with a thinner thickness being plugged in the base of FIG. 1.

FIG. 1 is a perspective view of an electronic assembly of an embodiment of the application. FIG. 2 is a schematic view of an electronic component with a thinner thickness being plugged in the base of FIG. 1. Referring to FIGS. 1 and 2, the electronic assembly 100 of the present embodiment includes at least one electronic component 110 (a plurality of the electronic components are illustrated) and a base 120. The base 120, for example, is a charger. The electronic component 110 shown in FIG. 1 and the electronic component 110' shown in FIG. 2, for example, are batteries for a portable device, wherein the electronic component 110, for example, is a high capacity battery, and the electronic component 110', for example, is a low capacity battery. The electronic component 110 and the electronic component 110' each include a first thickness T1 and a second thickness T2, wherein the first thickness T1 is greater than the second thickness T2.

Figure 3:
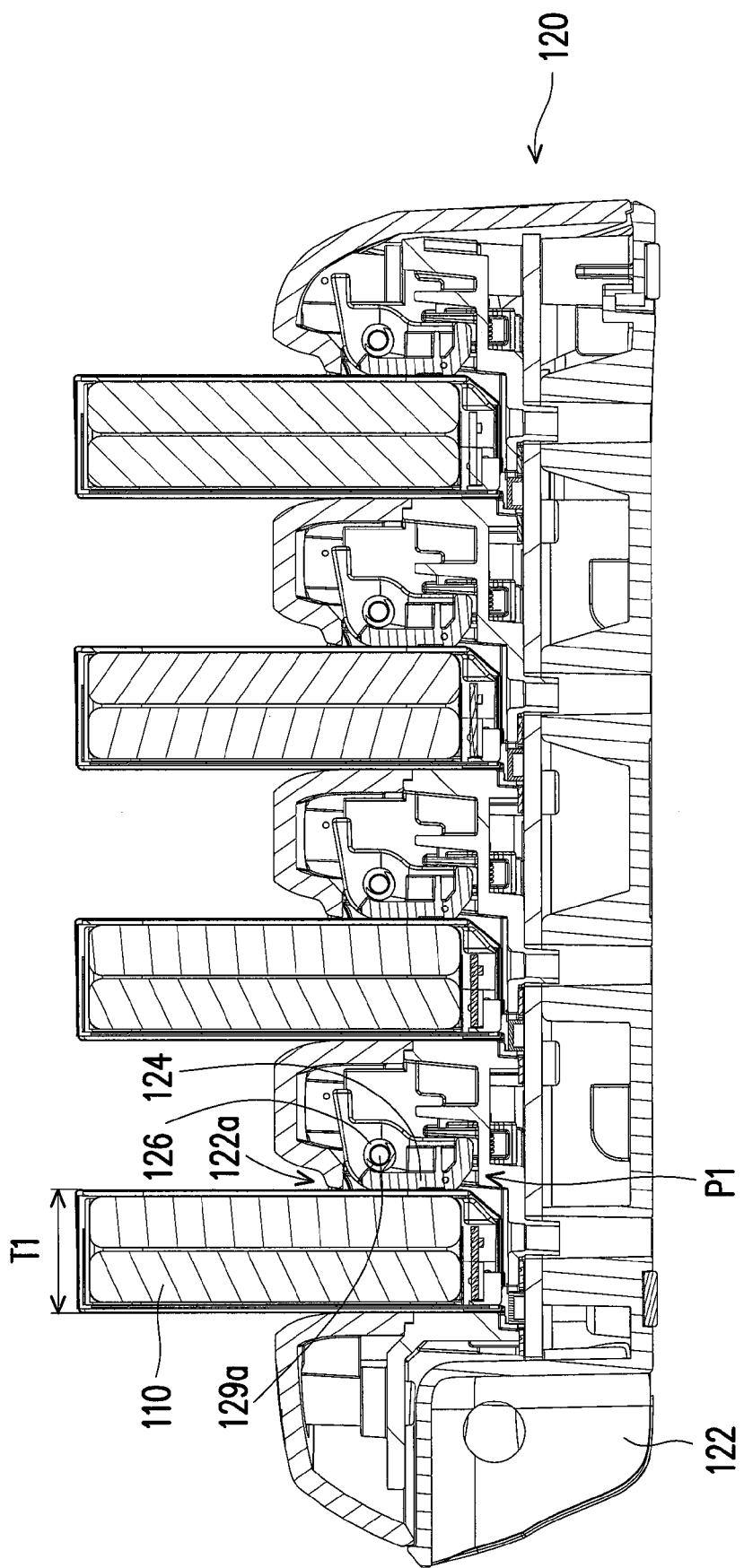
FIG. 3 is a cross-sectional view of an electronic assembly of FIG. 1.
Figure 4:
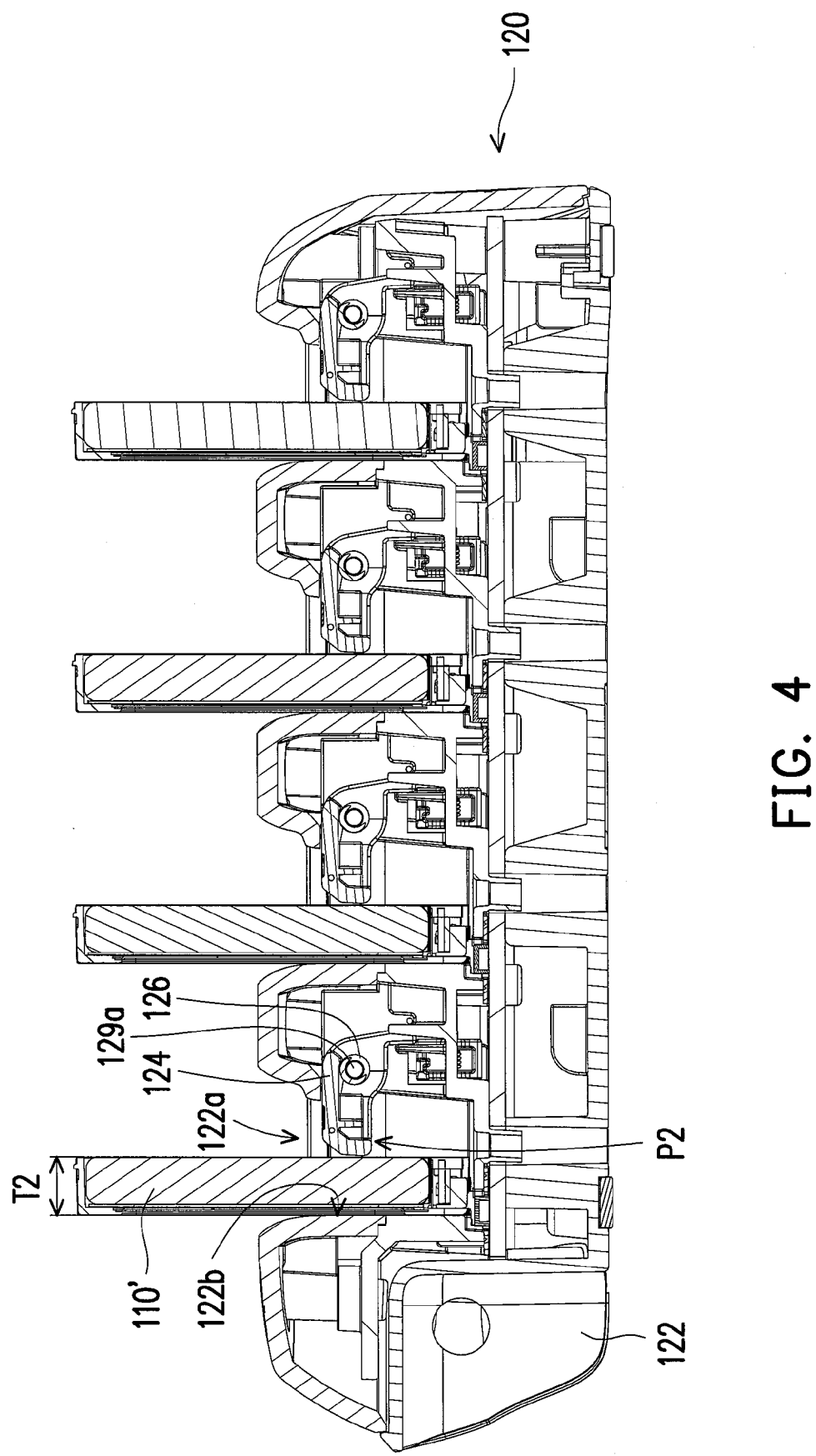
FIG. 4 is a cross-sectional view of an electronic assembly of FIG. 2.

FIG. 3 is a cross-sectional view of an electronic assembly of FIG. 1. FIG. 4 is a cross-sectional view of an electronic assembly of FIG. 2. Referring to FIGS. 3 and 4, the base 120 includes a main body 122, at least a supporting element 124 (a plurality of supporting elements are illustrated), and at least a first elastic element 126 (a plurality of elastic elements are illustrated). The main body 122 includes at least a slot 122a (a plurality of slots are illustrated). The supporting element 124 is movably disposed on the main body 122. The first elastic element 126, for example, is a torsion spring connected between the main body 122 and the supporting element 124. When the supporting element 124 is at a first position P1, the supporting element 124 is hidden in the main body 122, and the electronic component 110 having a first thickness T1 is adapted to be inserted into the slot 122a for a charging process. The first thickness T1 of the electronic component 110, for example, is equal to a thickness of the slot 122a in order for the electronic component 110 to be firmly inserted in the slot 122a.

When the supporting element 124 is moved to a second position P2 by the elastic force of the first elastic element 124 as shown in FIG. 4, at least part of the supporting element 124 is in the slot 122a. The second thickness T2 of the electronic component 110, for example, is equal to a distant between an inner wall of the slot 122a and the supporting element 124. The electronic component 110' having the second thickness T2 is adapted to be inserted into the slot 122a and supported by the supporting element 124.

Under the above method, the movable supporting element 124 is disposed inside the main body 122 of the base 120, and the supporting element 124 is able to move to the first position P1 and hide in the main body 122 or move to the second position P2 with at least partially disposed in the slot 122a. When the supporting element 124 is at the first position P1, a user may insert an electronic component 110 with a thicker thickness into the slot 122a while the supporting element 124 hidden inside the main body 122 may not become an obstacle for the insertion of the electronic component 110. When the supporting element 124 is at a second position P2, the user may insert the electronic component 110' having a smaller thickness into the slot 122a. Here, the supporting element 124 located inside the slot 122a may support the component 110' in order to prevent the electronic component 110' being unable to firmly support inside the slot 122a due to the thickness of the electronic component 110' being smaller than the thickness of the slot 122a. Therefore, when the electronic component 110' is inserted into the base 120 for charging, the circumstances of unable to charge or poor contact is prevented.

In the present embodiment, the supporting element 124, for example, is pivoted on the main body 122 and is adapted to rotate around the main body 122 between the first position P1 as shown in FIG. 3 and the second position P2 as shown in FIG. 4. In other embodiment, the supporting element 124 may be movably disposed on the main body 122 by other appropriate methods. The invention is not limited thereto.

The electronic component 110 with higher thickness not only is capable of inserting into the slot 122a when the supporting element 124 is hidden inside the main body 122 (which is when the supporting element 124 is at the first position P1), but also is capable of inserting into the slot 122a and drive the supporting element 124 away from the slot 122a when the supporting element 124 is inside the main body 122 (which is when the supporting element 124 is at the second position P2) as described below.

Figure 5A:
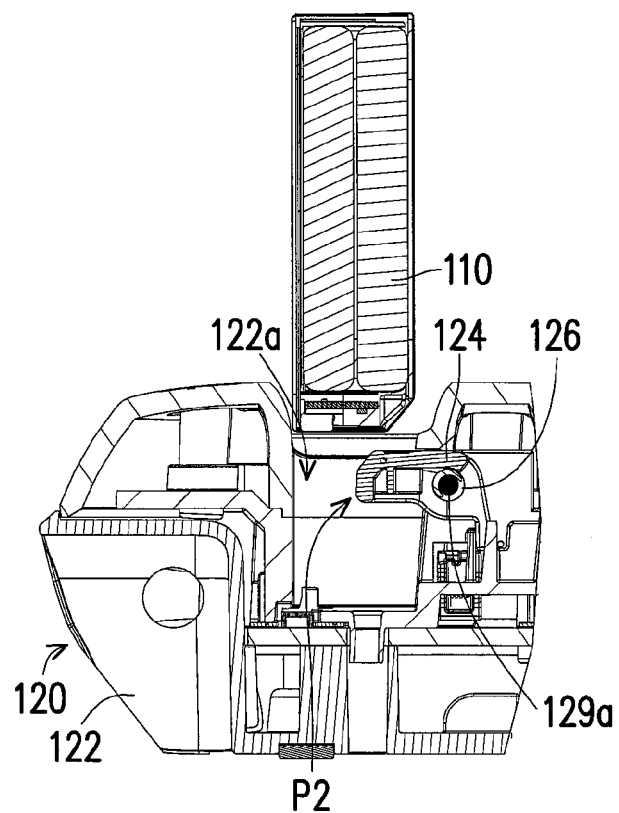
FIGS. 5A and 5B is a flowchart illustrating an electronic component of FIG. 3 being inserted into the slot of the main body.
Figure 5B:
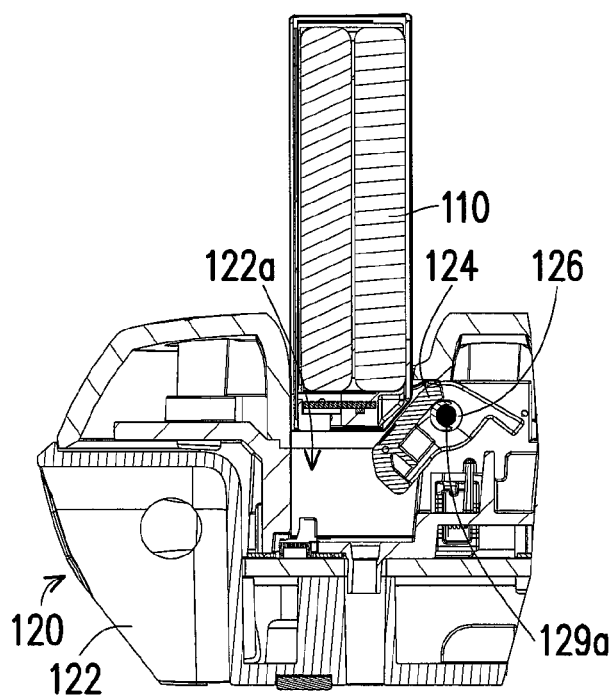

FIGS. 5A and 5B is a flowchart illustrating an electronic component of FIG. 3 being inserted into the slot of the main body. When the supporting element 124 is at the second position P2, the electronic component 110 with higher thickness is adapted to be inserted into the slot 122a from the position as shown in FIG. 5A, resist the elastic force of the first elastic element 124 to push the supporting element 124 as shown in FIG. 5B, and push the supporting element 124 to the first position P1 as shown in FIG. 3 in order for the supporting element 124 to be hidden inside the main body 122 and prevented from impede the insertion of the electronic component 110. Herein, whether the supporting element 124 of the base 120 is at the first position P1 and hidden inside the main body 122 of the base 120 or at the second position P2 and inside the slot 122a of the main body 122, the electronic component 110 having a bigger thickness is capable of being inserted into the slot 122a successfully.

Figure 6A:
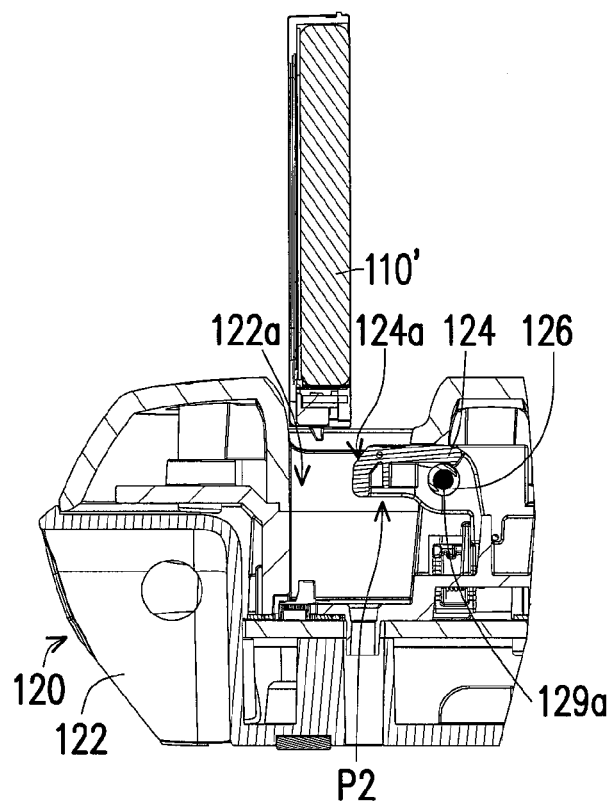
FIGS. 6A and 6B is a flowchart illustrating an electronic component of FIG. 4 being inserted into the slot of the main body.
Figure 6B:
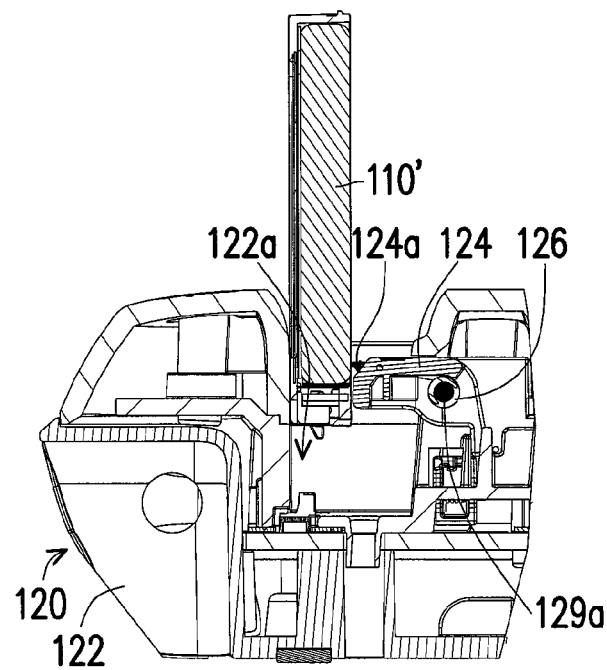

FIGS. 6A and 6B is a flowchart illustrating an electronic component of FIG. 4 being inserted into the slot of the main body. Referring to FIGS. 6A and 6B, in the present embodiment, the supporting element 124 includes a guide inclined plane 124a. When the supporting element 124 is at the second position P2, the electronic component 110' having the lower thickness is adapted to move from a position as shown in FIG. 6A to a position as shown in 6B and guided by the guide inclined plane 124a from the position as shown in FIG. 6B to be inserted in the slot 122a as the state shown in FIG. 4.

Figure 7:
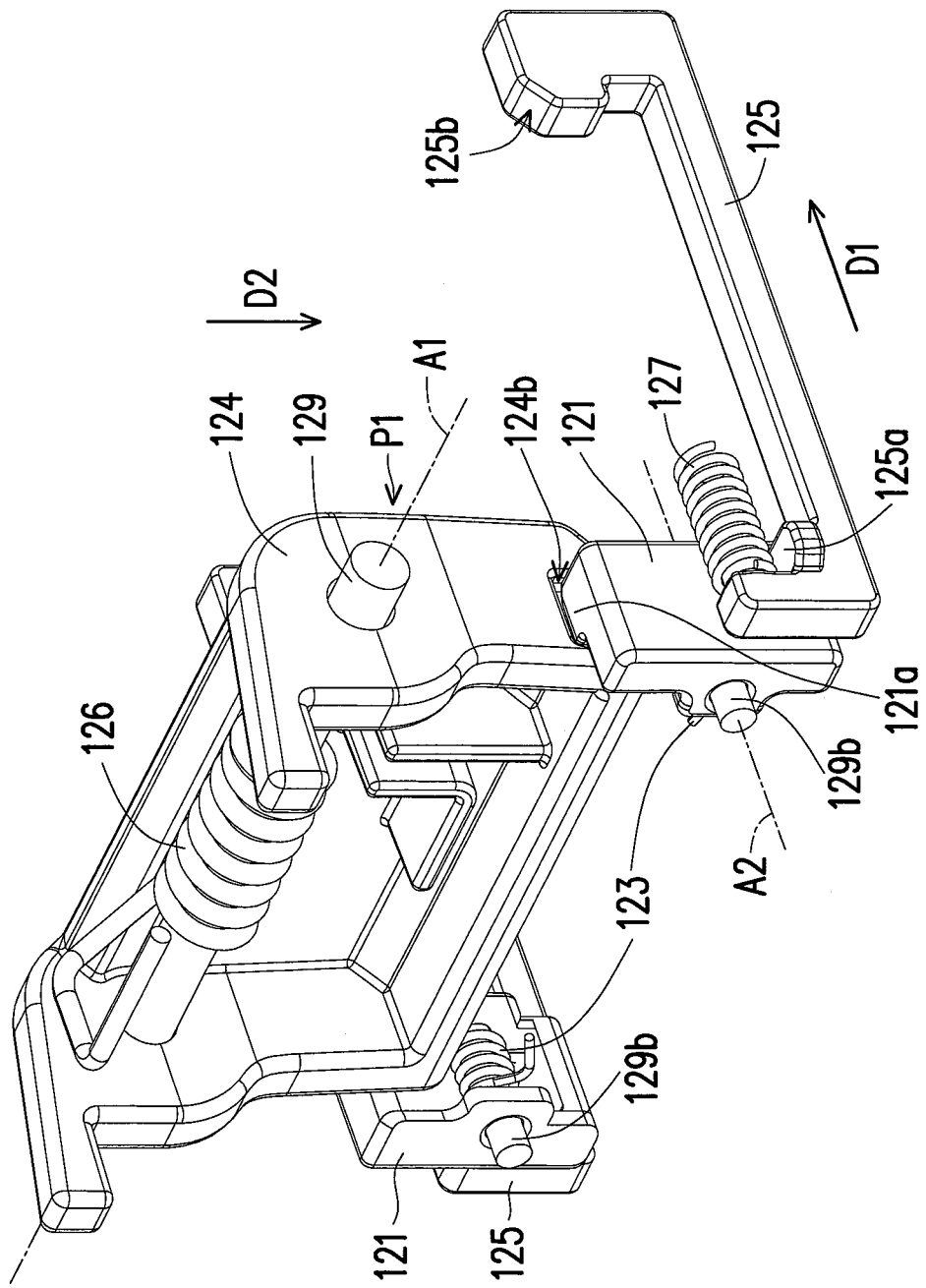
FIG. 7 is a perspective view of part of the component of the base of FIG. 3.

FIG. 7 is a perspective view of part of the component of the base of FIG. 3. Referring to FIG. 7, the supporting element 124 of the present embodiment is pivoted on the main body 122 (as shown in FIG. 1) along an axis A1 by a shaft 129a. The first elastic element 126 is disposed on the shaft 129a, wherein the axis A1, for example, is perpendicular an insert direction D2 of the electronic component. In other embodiment, the supporting element 124 may be pivoted with other appropriate method. The invention is not limited thereto.

The electronic component 110' with lower thickness not only is capable of inserting into the slot 122a when the supporting element 124 is hidden inside the slot 122a of the main body 122 (which is when the supporting element 124 is at the second position P2), but also is further capable of inserting into the slot 122a when the supporting element 124 is hidden inside the main body 122 (which is when the supporting element 124 is at the first position P1) and drive the supporting element 124 to support the electronic component 110' as described below.

Figure 8:
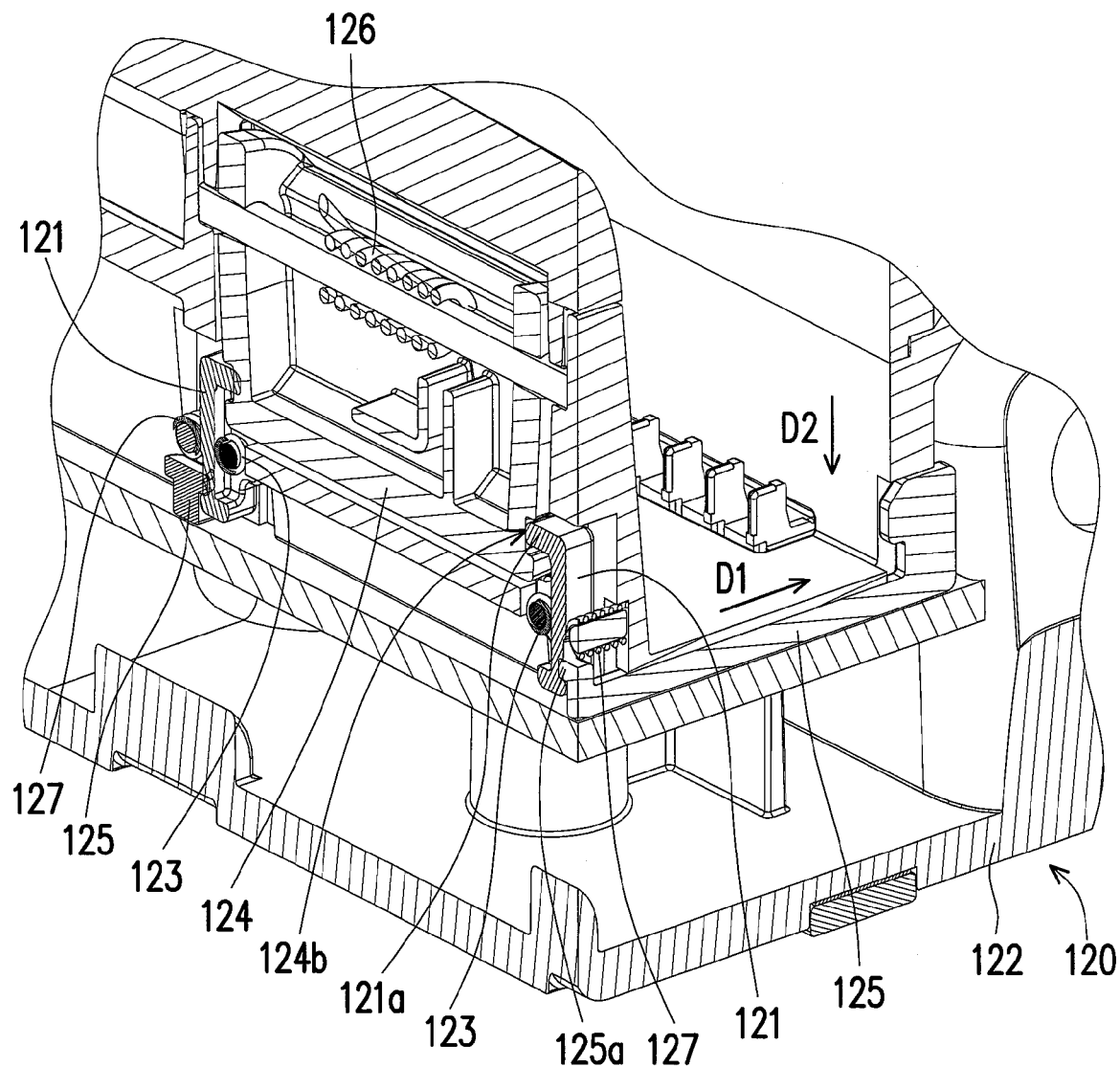
FIG. 8 is a partial perspective view of the base of FIG. 3.

FIG. 8 is a partial perspective view of the base of FIG. 3. Referring to FIGS. 7 and 8, in the present embodiment, the base 120 further includes at least a positioning element 121 (two positioning elements are illustrated), at least a second elastic element 123 (two elastic elements are illustrated), at least a rod 125 (two rods are illustrated), and at least a third elastic element 127 (two third elastic elements are illustrated). The positioning element 121 is movably disposed at the main body 122 and adapted to resist the elastic force of the first elastic element 126 and position the supporting element 124 at the first position P1. The second elastic element 123, for example, is a torsion spring connecting between the positioning element 121 and the main body 122 for the positioning element 121 to be fixed at a state as shown in FIGS. 7 and 8 by the elastic force of the second elastic element 123. The rod 125 is movably disposed on the main body 122 and is used to drive the positioning element 121 to move. The third elastic element 127, for example, is a compression spring connecting between the rod 125 and the main body 122.

Figure 9:
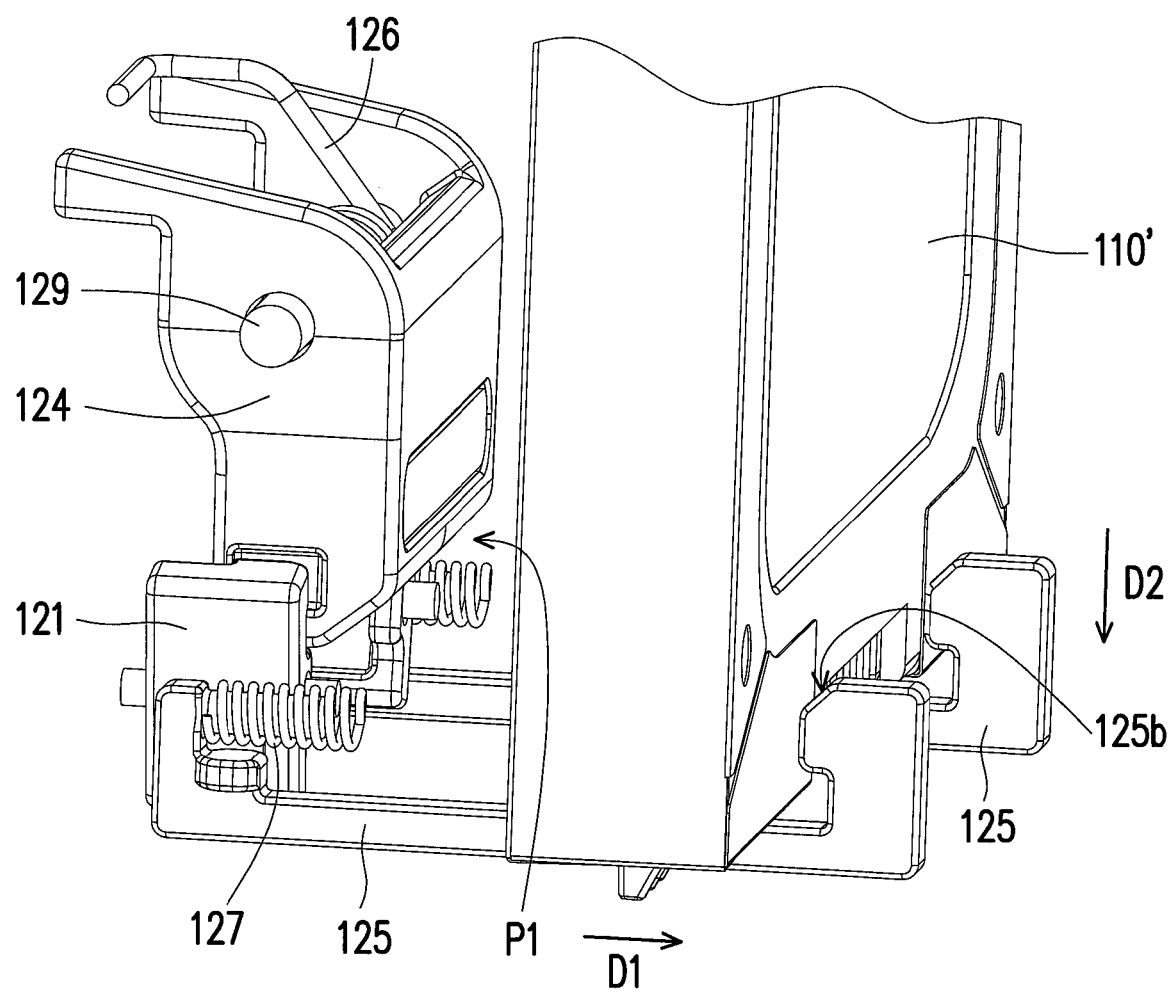
FIG. 9 is a schematic view illustrating the electronic component of FIG. 4 moving the rod of FIG. 7.
Figure 10:
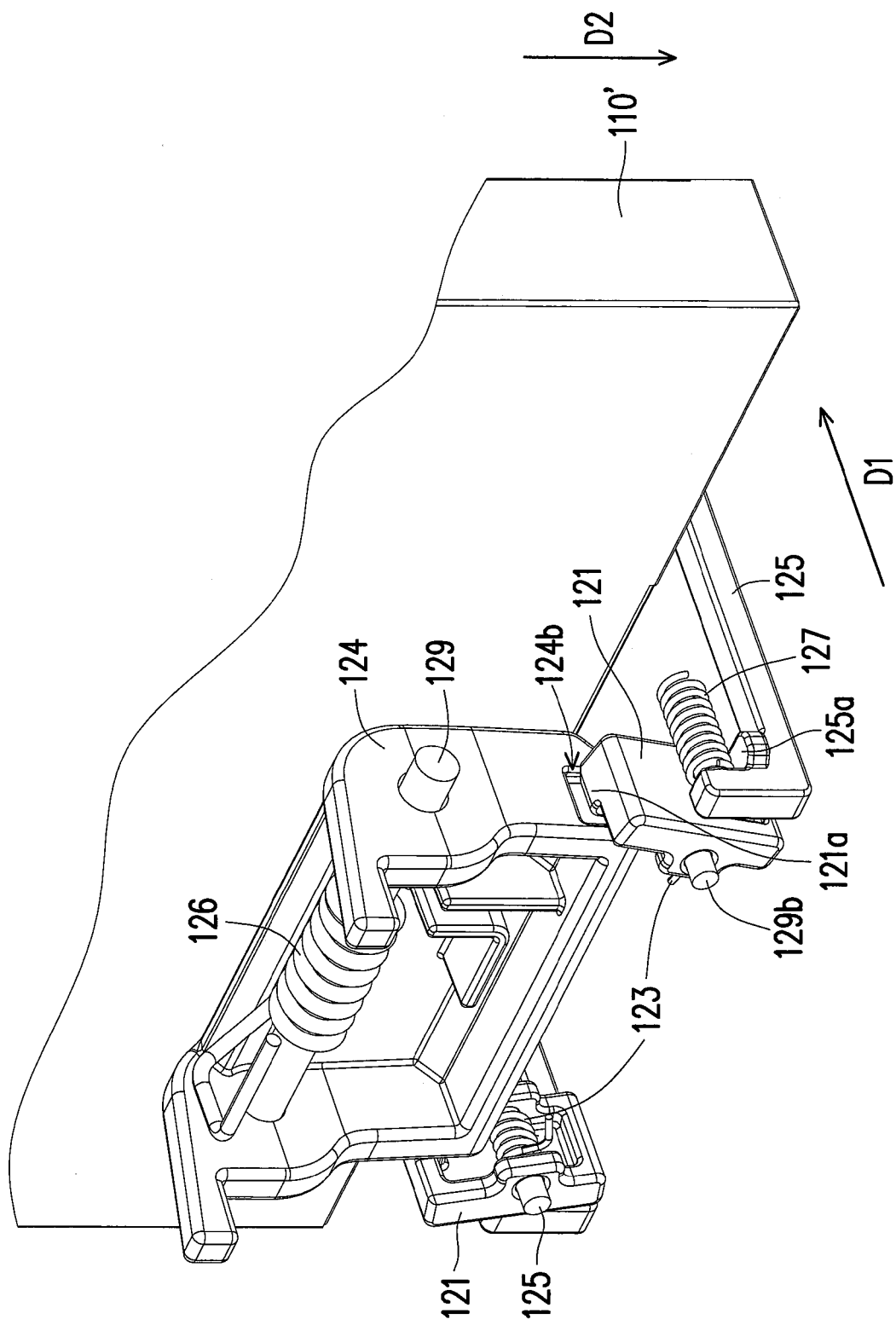
FIG. 10 is a perspective view from another angle of view of FIG. 9.

FIG. 9 is a schematic view illustrating the electronic component of FIG. 4 moving the rod of FIG. 7. FIG. 10 is a perspective view from another angle of view of FIG. 9. When the positioning element 121 positions the supporting element 124 on the first position P1 as shown in FIGS. 7 and 8, the user may insert the electronic component 110' having a second thickness T2 into the slot 122a as shown in FIG. 4. Here, the electronic component 110' resists the elastic force of the third elastic element 127 and pushes the rod 125 as shown in FIG. 9 in order for the rod 125 to drive the positioning element 121 to resist the elastic force of the second elastic element 123 to deviate from the supporting element 124 as shown in FIG. 10. Here, the supporting element 124 is released by the positioning element 121 and rotated to the second position P2, as shown in FIG. 9, from the first position P1, as shown in FIG. 4, by the elastic force of the first elastic element 126 in order for the electronic component 110' to be supported by the supporting element 124. Accordingly, whether the supporting element 124 of the base 120 is at the first position P1 and hidden inside the main body 122 of the base 120 or at the second position P2 and inside the slot 122a of the main body 122, the electronic component 110' having a lower thickness is able to be smoothly supported by the supporting element 124 after being inserted into the slot 122a.

Referring to FIGS. 7 and 8, to be more specific, the supporting element 124 includes a groove 124b. The positioning element 121 includes a bump 121a. The bump 121a is adapted to be wedged to the groove 124b so that the supporting element 121 is positioned. The positioning element 121 is pivoted on the main body 122 along an axis A2 by the shaft 129b. The bump 121a of the positioning element 121 is adapted to be wedged to the groove 124b with the positioning element 121 rotating around the main body 122 as shown in FIG. 7, or to be moved away from the groove 124b as shown in FIG. 10 to release the positioning element 121. The axis A2, for example, is perpendicular to a plug direction D2 of the electronic component and perpendicular to the pivoted axis A1. In the other embodiment, the positioning element 121 may pivot with other appropriate method. The invention is not limited thereto.

Figure 11A:
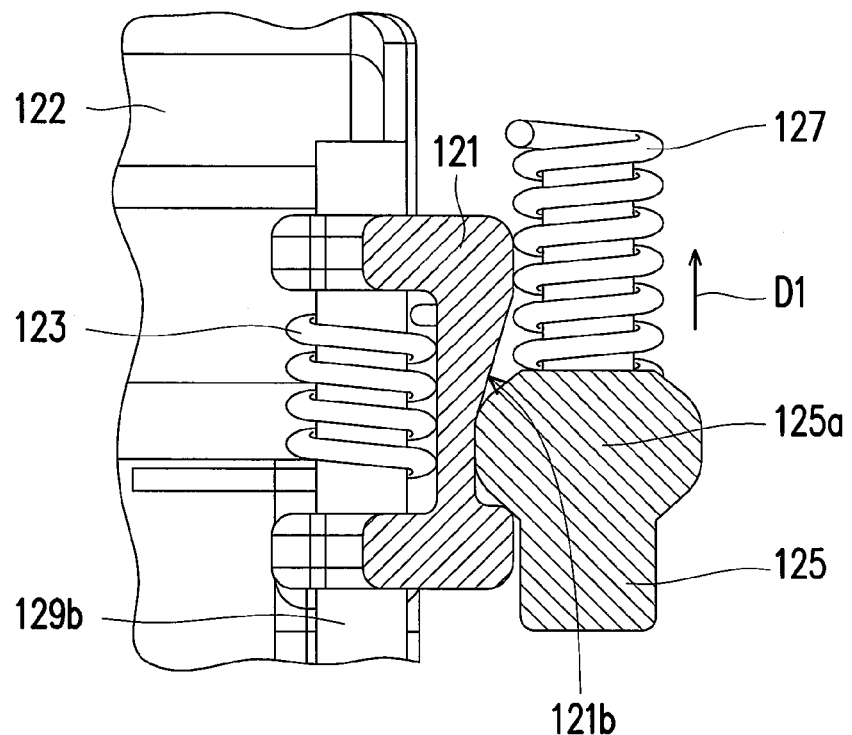
FIG. 11A is a partial cross-sectional view of the base of FIG. 7.
Figure 11B:
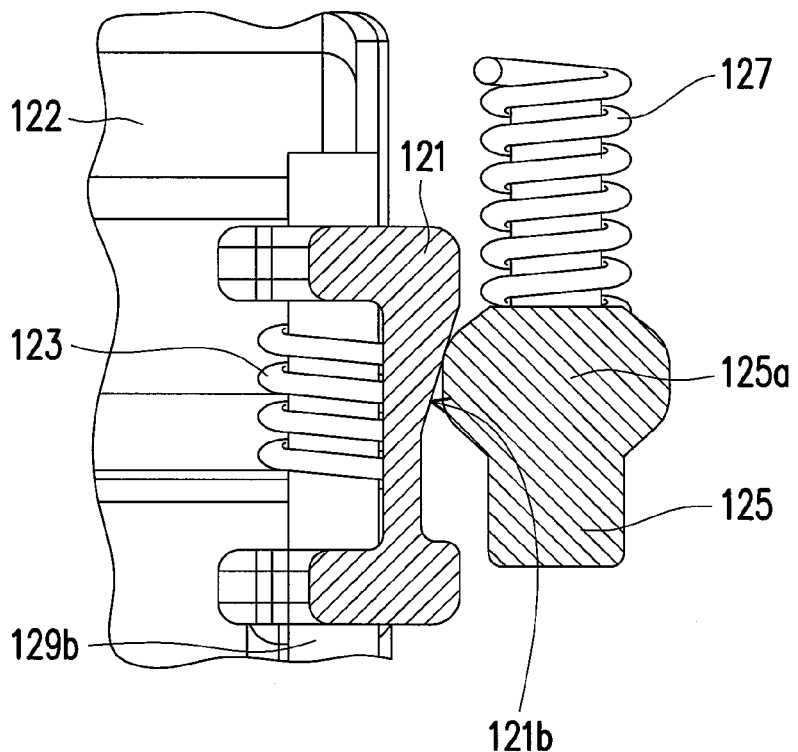
FIG. 11B is a partial cross-sectional view of the base of FIG. 10.

FIG. 11A is a partial cross-sectional view of the base of FIG. 7. FIG. 11B is a partial cross-sectional view of the base of FIG. 10. Referring to FIGS. 7, 8, and 11A, to be more specific, the rod 125 is slidably disposed on the main body 122 along a sliding direction D1. The rod 125 includes a pushing block 125a. The positioning element 121 includes a guide inclined plane 121b. When the user uses the electronic component 110' to push the rod 125 to slide along the direction D1 as shown in FIG. 9, the pushing block 125a moves from a position, as shown in FIG. 11A, to a position, as shown in FIG. 11B, along the guide inclined plane 121b of the positioning element 121 while the rod 125 slides respectively to the main body 122. During the process of the pushing block 125a moving along the guide inclined plane 121b of the positioning element 121, an amount of interference between the pushing block 125a and the positioning element 121 gradually increases and pushes the positioning element 121 to rotate from a state, as shown in FIGS. 7 and 11A, to a state, as shown in FIGS. 10 and 11B, to drive the bump 121a of the positioning element 121 to move away from the groove 124b of the supporting element 124. The sliding direction D1, for example, is perpendicular to an insert direction D2 of the electronic component. In other embodiment, the rod 125 may be disposed with other appropriate method. The invention is not limited thereto.

Referring to FIGS. 7 and 9, the rod 125 of the present embodiment includes a guide inclined plane 125b. During the process when the electronic component 110' inserts into the slot 122a (as shown in FIG. 4) of the base 120 along a insert direction D2, the electronic component 110' is adapted to slide move along the guide inclined plane 125b of the rod 125 to push the rod 125 to slide along a sliding direction D1.

Figure 12:
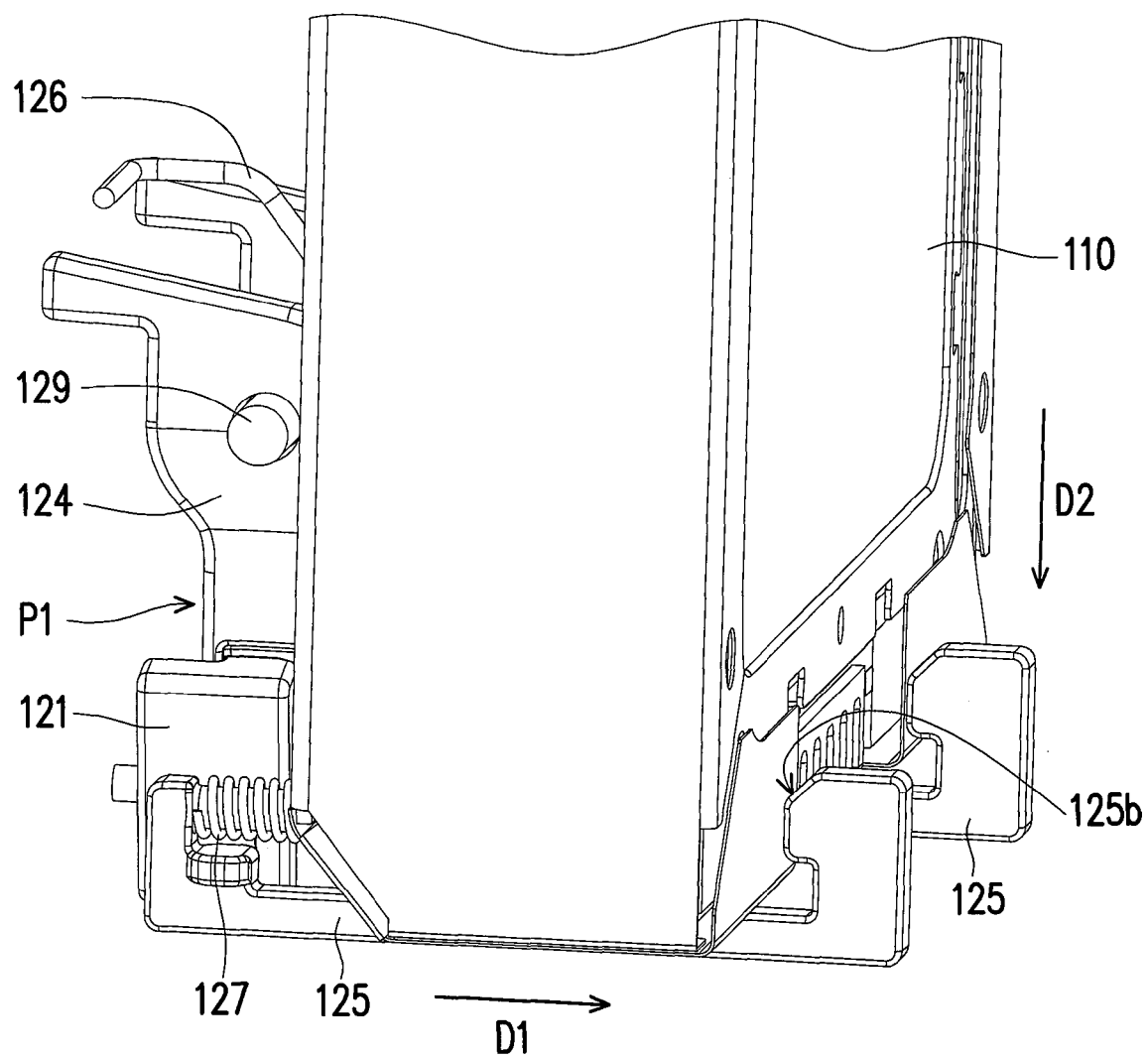
FIG. 12 is a schematic view illustrating the electronic component of FIG. 4 moving the rod of FIG. 7.
Figure 13:
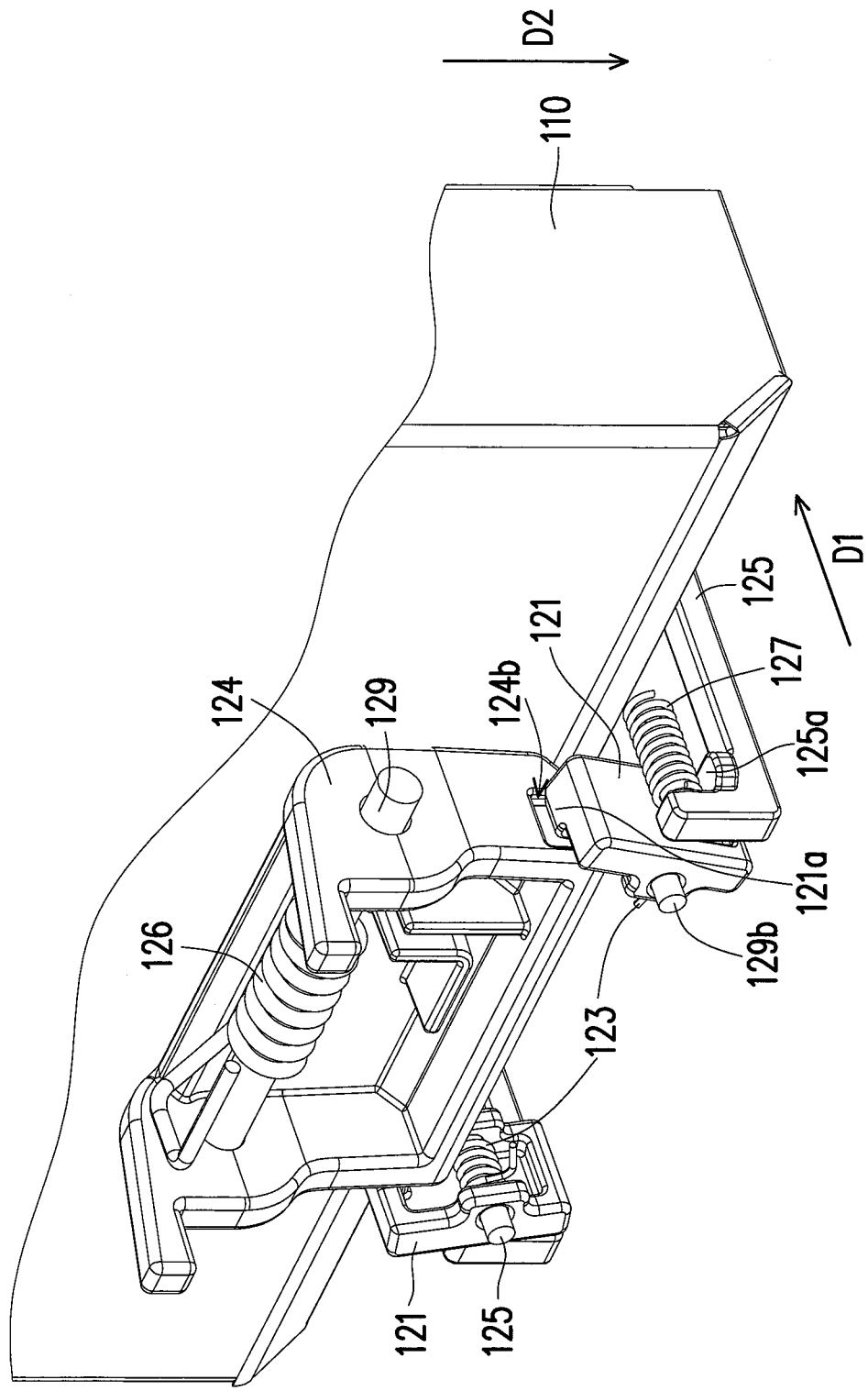
FIG. 13 is a perspective view from another angle of view of FIG. 12.

FIG. 12 is a schematic view illustrating the electronic component of FIG. 4 moving the rod of FIG. 7. FIG. 13 is a perspective view from another angle of view of FIG. 12. Under the circumstance where the positioning element 121, as shown in FIGS. 7 and 8, positions the supporting element 124 at the first position P1, if the user insert the electronic component 110 having the higher thickness into the slot 122a (as shown in FIG. 3) of the base 120, then the electronic component 110 may resist the elastic force of the third elastic element 127 and push the rod 125, as shown in FIG. 12, in order for the rod 125 to drive the positioning element 121 to resist the elastic force of the second elastic element 123 to move away from the supporting element 124, as shown in FIG. 13. Here, even though the supporting element 124 is released by the positioning element 121, the electronic component 110 having the higher thickness may support the supporting element 124. Therefore, the supporting element 124 may not rotate due to the elastic force of the first elastic element 126, and the supporting element is limited at the first position P1.

In view of the above, a movable supporting element is disposed inside the main body of the base of the invention, and the supporting element is able to move to the first position and hide in the main body or move to the second position with at least partially disposed in the slot. When the supporting element is at the first position, a user may insert an electronic component with a thicker thickness into the slot while the supporting element hidden inside the main body may not become an obstacle for the insertion of the electronic component. When the supporting element is at the second position, the user may insert an electronic component with a thinner thickness into the slot. At this point, the supporting element inside the slot is capable of supporting the electronic component and avoiding the situation where the electronic component is not able to steadily support inside the slot due to a thinner thickness. Therefore, the base of the invention is adapted to electronic component with different thickness and may be used broadly.

Although the invention has been described with reference to the above embodiments, it will be apparent to one of the ordinary skill in the art that modifications and variations to the described embodiments may be made without departing from the spirit and scope of the invention. Accordingly, the scope of the invention will be defined by the attached claims not by the above detailed descriptions.

What is claimed is:

1. A base, adapted for an electronic component, wherein the electronic component and another electronic component have a first thickness and a second thickness respectively and the first thickness is greater than the second thickness, the base comprising:
a main body, having a slot;
a supporting element, movably disposed on the main body, wherein when the supporting element is at a first position, the supporting element is hidden inside the main body, and the electronic component having the first thickness is adapted to be inserted into the slot;
a first elastic element, connected between the main body and the supporting element, wherein when the supporting element is moved to a second position by an elastic force of the first elastic element, at least part of the supporting element is inside the slot, and the electronic component having the second thickness is adapted to be inserted into the slot and supported by the supporting element;
a positioning element, movably disposed on the main body and adapted to resist the elastic force of the first elastic element to position the supporting element at the first position; and
a second elastic element, connected between the positioning element and the main body, wherein the positioning element is adapted to resist an elastic force of the second elastic element to deviate from the supporting element.

2. The base according to claim 1, wherein the supporting element is pivoted on the main body and adapted to rotate relative to the main body between the first position and the second position.

3. The base according to claim 1, wherein the first thickness is equal to a width of the slot.

4. The base according to claim 1, wherein when the supporting element is at the second position, the second thickness is equal to a distance between an inner wall of the slot and the supporting element.

5. The base according to claim 1, wherein when the supporting element is at the second position, the electronic component having the first thickness is adapted to be inserted into the slot and resist the elastic force of the first elastic element to push the supporting element to the first position.

6. The base according to claim 1, wherein the supporting element comprises a guide inclined plane, and when the supporting element is at the second position, the electronic component having the second thickness is adapted to be guided by the guide inclined plane to be inserted into the slot.

7. The base according to claim 1, wherein the supporting element comprises a groove, the positioning element comprises a bump, and the bump is adapted to be wedged to the groove to position the supporting element.

8. The base according to claim 7, wherein the positioning element is pivoted on the main body and the bump is adapted to be wedged to or deviated from the groove while the positioning element rotates relatively to the main body.

9. The base according to claim 1, further comprising:
a rod, movably disposed on the main body; and
a third elastic element, connected between the rod and the main body, wherein when the positioning element positions the supporting element at the first position, the electronic component having the second thickness is adapted to be inserted into the slot and resist an elastic force of the third elastic element to push the rod, such that the positioning element is driven to deviate from the supporting element by the rod.

10. The base according to claim 9, wherein the rod comprises a pushing block, the positioning element comprises a guide inclined plane, and the pushing block is adapted to move along the guide inclined plane to push the positioning element, so as to drive the positioning element to deviate from the supporting element.

11. The base according to claim 10, wherein the rod is slidably disposed on the main body, and the pushing block is adapted to push the positioning element while the rod slides relatively to the main body.

12. The base according to claim 9, wherein the rod comprises a guide inclined plane and the electronic component having the second thickness is adapted to move along the guide inclined plane to push the rod.

13. The base according to claim 1, wherein the base is a charging dock and the electronic component is a battery.

14. An electronic assembly, comprising:
 an electronic component, wherein the electronic component and another electronic component have a first thickness and a second thickness respectively, and the first thickness is greater than the second thickness; and
 a base, comprising:
  a main body, having a slot;
  a supporting element, movably disposed on the main body, wherein when the supporting element is at a first position, the supporting element is hidden inside the main body, and the electronic component having the first thickness is adapted to be inserted into the slot;
  a first elastic element, connected between the main body and the supporting element, wherein when the supporting element is moved to a second position by an elastic force of the first elastic element, at least part of the supporting element is inside the slot, and the electronic component having the second thickness is adapted to be inserted into the slot and supported by the supporting element;
  a positioning element, movably disposed on the main body and adapted to resist the elastic force of the first elastic element to position the supporting element at the first position; and
  a second elastic element, connected between the positioning element and the main body, wherein the positioning element is adapted to resist an elastic force of the second elastic element to deviate from the supporting element.

15. The electronic assembly according to claim 14, wherein the supporting element is pivoted on the main body and adapted to rotate respectively to the main body between the first position and the second position.

16. The electronic assembly according to claim 14, wherein the first thickness is equal to a width of the slot.

17. The electronic assembly according to claim 14, wherein when the supporting element is at the second position, the second thickness is equal to a distance between an inner wall of the slot and the supporting element.

18. The electronic assembly according to claim 14, wherein when the supporting element is at the second position, the electronic component having the first thickness is adapted to be inserted into the slot and resist the elastic force of the first elastic element to push the supporting element to the first position.

19. The electronic assembly according to claim 14, wherein the supporting element comprises a guide inclined plane, and when the supporting element is at the second position, the electronic component having the second thickness is adapted to be guided by the guide inclined plane to be inserted into the slot.

20. The electronic assembly according to claim 14, wherein the supporting element comprises a groove, the positioning element comprises a bump, and the bump is adapted to be wedged to the groove to position the supporting element.

21. The electronic assembly according to claim 20, wherein the positioning element is pivoted on the main body and the bump is adapted to be wedged to or deviated from the groove while the positioning element rotates relatively to the main body.

22. The electronic assembly according to claim 14, wherein the base further comprises:
 a rod, movably disposed on the main body; and
 a third elastic element, connected between the rod and the main body, wherein when the positioning element positions the supporting element at the first position, the electronic component having the second thickness is adapted to be inserted into the slot and resist an elastic force of the third elastic element to push the rod, such that the positioning element is driven to deviate from the supporting element by the rod.

23. The electronic assembly according to claim 22, wherein the rod comprises a pushing block, the positioning element comprises a guide inclined plane, and the pushing block is adapted to move along the guide inclined plane to push the positioning element, so as to drive the positioning element to deviate from the supporting element.

24. The electronic assembly according to claim 23, wherein the rod is slidably disposed on the main body, and the pushing block is adapted to push the positioning element while the rod slides relatively with the main body.

25. The electronic assembly according to claim 22, wherein the rod comprises a guide inclined plane and the electronic component having the second thickness is adapted to move along the guide inclined plane to push the rod.

26. The electronic assembly according to claim 14, wherein the base is a charging dock and the electronic component is a battery.

* * * * *